(12) United States Patent
Harrison

(10) Patent No.: US 10,090,731 B2
(45) Date of Patent: Oct. 2, 2018

(54) ELECTRICALLY DRIVEN INDUSTRIAL VIBRATOR WITH CIRCUMJACENT ECCENTRIC WEIGHT AND MOTOR

(71) Applicant: Martin Engineering Company, Neponset, IL (US)

(72) Inventor: Paul B. Harrison, Neponset, IL (US)

(73) Assignee: MARTIN ENGINEERING COMPANY, Neponset, IL (US)

( * ) Notice: Subject to any disclaimer, the term of this patent is extended or adjusted under 35 U.S.C. 154(b) by 0 days.

(21) Appl. No.: 15/831,677

(22) Filed: Dec. 5, 2017

(65) Prior Publication Data

US 2018/0097423 A1 Apr. 5, 2018

Related U.S. Application Data

(63) Continuation of application No. 14/689,772, filed on Apr. 17, 2015, now Pat. No. 9,882,449.

(51) Int. Cl.
  *H02K 7/06* (2006.01)
  *H02K 17/16* (2006.01)
(52) U.S. Cl.
  CPC ............. *H02K 7/063* (2013.01); *H02K 17/16* (2013.01)
(58) Field of Classification Search
  CPC ................................ H02K 17/16; H02K 7/063
  USPC ............... 310/81, 25, 30, 211, 111, 112, 113
  See application file for complete search history.

(56) References Cited

U.S. PATENT DOCUMENTS

| | | | |
|---|---|---|---|
| 3,757,148 A | 9/1973 | Philibert | |
| 3,772,923 A | 11/1973 | Burt | |
| 4,211,121 A | 7/1980 | Brown | |
| 5,942,833 A * | 8/1999 | Yamaguchi | H02K 7/063 310/268 |
| 6,107,715 A * | 8/2000 | Patterson | B65G 27/08 310/17 |
| 6,326,711 B1 | 12/2001 | Yamaguchi et al. | |
| 6,365,995 B1 | 4/2002 | Fukuda et al. | |
| 6,479,914 B2 | 11/2002 | Yoshida et al. | |
| 6,486,579 B1 * | 11/2002 | Furuya | G06F 3/016 310/81 |
| 7,709,983 B2 | 5/2010 | Umehara et al. | |
| 2003/0020345 A1 | 1/2003 | Mooney | |
| 2004/0091127 A1 * | 5/2004 | Yasuda | B06B 1/16 381/162 |
| 2004/0104631 A1 * | 6/2004 | Noguchi | H02K 5/1675 310/81 |
| 2005/0029880 A1 | 2/2005 | Noguchi | |
| 2005/0179332 A1 | 8/2005 | Park et al. | |
| 2006/0267441 A1 * | 11/2006 | Hang | B22D 19/0054 310/211 |
| 2008/0150380 A1 | 6/2008 | Hsiao et al. | |

(Continued)

*Primary Examiner* — Hanh Nguyen
(74) *Attorney, Agent, or Firm* — Thompson Coburn LLP

(57) ABSTRACT

An electrically driven eccentric weight industrial vibrator comprises a housing, a stator, a rotor, and at least one eccentric weight. The housing defines an internal chamber. The stator is positioned within the internal chamber of the housing and is fixed in rotation relative to the housing. The rotor encircles the stator and is rotationally connected to the stator and the housing in a manner such that the rotor is able to revolve around the stator within the internal chamber of the housing. The eccentric weight is mounted to the rotor in a manner such that the eccentric weight is able to revolve about the stator together with the rotor.

10 Claims, 4 Drawing Sheets

(56) References Cited

U.S. PATENT DOCUMENTS

2008/0278012 A1 11/2008 Matsubara
2011/0081263 A1 4/2011 Yoshino et al.
2012/0112577 A1* 5/2012 Strbuncelj ............ B66B 11/0438
310/63

* cited by examiner

ELECTRICALLY DRIVEN INDUSTRIAL VIBRATOR WITH CIRCUMJACENT ECCENTRIC WEIGHT AND MOTOR

CROSS-REFERENCE TO RELATED APPLICATIONS

This application is a continuation of U.S. Ser. No. 14/689,772, filed Apr. 17, 2015, which is currently pending, the disclosure of which is incorporated by reference herein.

BACKGROUND OF THE INVENTION

Field of the Invention

This invention pertains to vibratory devices of the type used in the bulk material handling industry. More particularly, this invention pertains to a rotary vibratory device having an eccentric weight that is supported by two radial bearings and comprises an electric motor extending axially between such bearings.

GENERAL BACKGROUND

Vibratory devices are used throughout the bulk material handling industry for various purposes. Vibratory devices are often attached to bulk material transfer chutes and bulk material storage hoppers to prevent bulk material from clinging to the walls of such chutes and hoppers. Vibratory devices are also utilized on sifting or sorting screens to prevent larger material from clogging the sifting screens and to speed the flow of material passing through the screens.

A common type of vibratory device is the rotary vibratory motor, wherein one or more eccentric weights are rotationally driven by and rotate about an axis to thereby create a revolving oscillating force. Other types of vibratory devices include, but are not limited to, acoustical vibration devices, air driven rotary vibrators, and linear vibrators. The present invention pertains specifically to an electrically driven rotary vibratory device wherein one or more eccentric weights are rotationally driven about an axis (hereafter referred to simple as a rotary vibratory device).

Some rotary vibratory devices comprise two or more eccentric weights positioned on axially opposite sides of an electric motor. Typically, such devices comprise a pair of bearings, each positioned axially between one of the eccentric weights and the electric motor. Typically eccentric weights are mounted to a shaft that extends through the bearings and the motor. As such, the rotation of the eccentric weights of such motors exerts large bending moments on the shaft. That causes the shaft to deflect, which reduces the life of the bearings since the loads thereon are not purely radial. Additionally the diameter of the shaft and bearings of such motors are typically minimized so as to reduce fabrication costs and the radial diameter of the rotor, but must be large enough to handle the eccentric loads. As a result, the bearings of electrically driven rotary vibratory devices are often periodically replaced and drive the maintenance needs of such devices.

SUMMARY OF THE INVENTION

The present invention provides advantages over prior art electrically driven rotary vibratory motors.

In one aspect of the invention, an electrically driven eccentric weight industrial vibrator may comprise a housing, a stator, a rotor, and at least one eccentric weight. The housing defines an internal chamber. The stator is positioned within the internal chamber of the housing and is fixed in rotation relative to the housing. The rotor encircles the stator and is rotationally connected to the stator and the housing in a manner such that the rotor is able to revolve around the stator within the internal chamber of the housing. The eccentric weight is mounted to the rotor in a manner such that the eccentric weight is able to revolve about the stator together with the rotor.

In another aspect of the invention, an electrically driven eccentric weight industrial vibrator may comprise a housing, an eccentric weight, and an electrically driven motor. The housing defines an internal chamber. The eccentric weight is rotationally mounted to the housing by first and second bearings and is located within the internal chamber of the housing such that the eccentric weight is rotatable about an axis. The electrically driven motor is positioned within the internal chamber of the housing and at least a majority of the motor is axially between the first and second bearings.

Further features and advantages of the present invention, as well as the operation of various embodiments of the present invention, are described in detail below with reference to the accompanying drawings.

Figure 1:
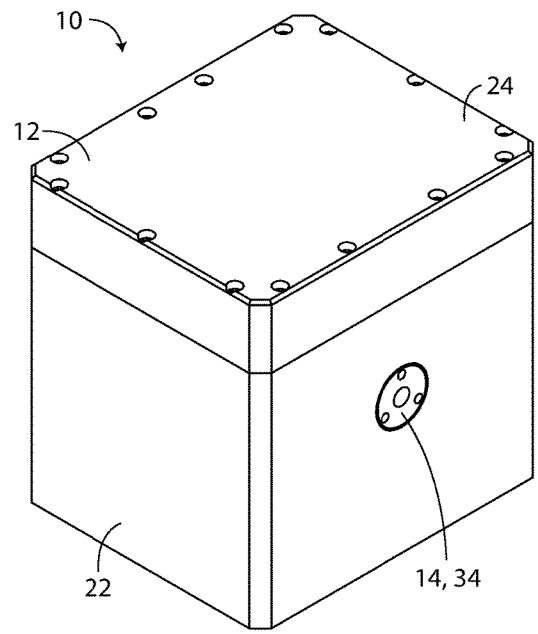
FIG. 1 is a perspective view of a preferred embodiment of an electrically driven industrial vibrator in accordance with the invention, showing the top, front, and right sides thereof.

Reference numerals in the written specification and in the drawing figures indicate corresponding items.

DETAILED DESCRIPTION OF THE PREFERRED EMBODIMENTS

Figure 2:
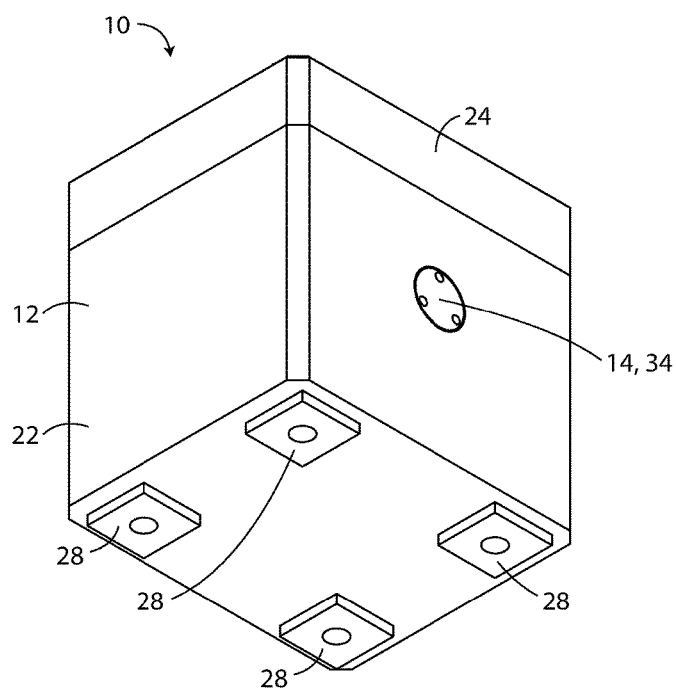
FIG. 2 is a perspective view of the vibrator shown in FIG. 1, showing the bottom, rear, and left sides thereof.

A perspective view of a preferred embodiment of an electrically driven industrial vibrator (10) in accordance with the invention is shown in its entirety in FIGS. 1 and 2. The vibrator (10) comprises a housing (12), a shaft (14), a stator (16), a rotor (18), and bearings (20).

The housing (12) comprises a main body (22) and a cover (24) that collectively define an internal cavity (26) of the housing. The main body (22) comprises a plurality of mounting elements (28) that are configured to secure and fix the vibrator (10) to a bulk material transfer device (not shown). As shown, the mounting elements (28) may simply be threaded fastener holes. Preferably the main body (22) of the housing (12) is configured to fully support the shaft (14) of the vibrator (10). The cover (24) of the housing (12) is removably mounted to the main body (22) of the housing and thereby provides access to the internal cavity (26) of the housing. Preferably, the cover (24) is removably mounted to the main body (22) via threaded fasteners.

The shaft (14) of the vibrator (10) preferably comprises a central portion (30), journal members (32) and mounting portions (34) that are axially aligned. The journal members (32) comprise cylindrical recesses for receiving ends of the central portion (30) of the shaft (14) and the mounting portions (34) of the shaft and operatively connect the central portion to the mounting portions. The mounting portions (34) of the shaft (14) are configured to connect the journal members (32) of the shaft to the main body (22) of the housing (12). The central portion (30), journal members (32), and mounting portions (34) of the shaft (14) are preferably press-fit to each other in a manner such that they function as a single unit. The central portion (30) and one of the mounting portions (34) of the shaft (14) comprise axial bores (36) that are configured and adapted for routing electrical conductors (not shown) to the stator (16). The journal members (32) are annular and preferably comprise radial holes (38) for the same purpose. The mounting portions (34) are preferably rotationally fixed to the housing (12) such that the entire shaft (14) is stationary relative to the housing.

The stator (16) comprises a main body (40) that encircles the shaft (14) and comprises a plurality of teeth (42) spaced circumferentially around the shaft. The stator (16) also comprises windings (44) (shown schematically as a single element for simplicity) formed by one or more electrical conductors that encircle the teeth (42) of the stator (16). As such, the teeth (42) of the stator (16) form electrically controlled magnetic poles. The main body (40) of the stator (16) is preferably press-fit onto the central portion (30) of the shaft (14). Thus, the stator (16) is configured to be rotationally fixed to the housing (12) of the vibrator (10) and to generate oscillating magnetic fields.

The rotor (18) of the vibrator (10) preferably comprises an eccentric weight (46), a squirrel cage assembly (48), and a pair of bearing caps (50). The eccentric weight (46) preferably encircles and supports the squirrel cage assembly (48) and has a center of mass that is offset from the central axis of the squirrel cage assembly. The squirrel cage assembly (48) comprises a plurality of induction bars (52) circumferentially spaced about a central axis shorted by annular rings (54). As an alternative to the squirrel cage assembly (48), the rotor (18) could comprise a plurality of permanent magnets circumferentially spaced about the central axis. The bearing caps (50) are near the axial ends of the eccentric weight (46) and are press fit into the eccentric weight. The bearing caps (50) each have a central bearing opening for receiving one of the bearings (20) of the vibrator (10).

Figure 3:
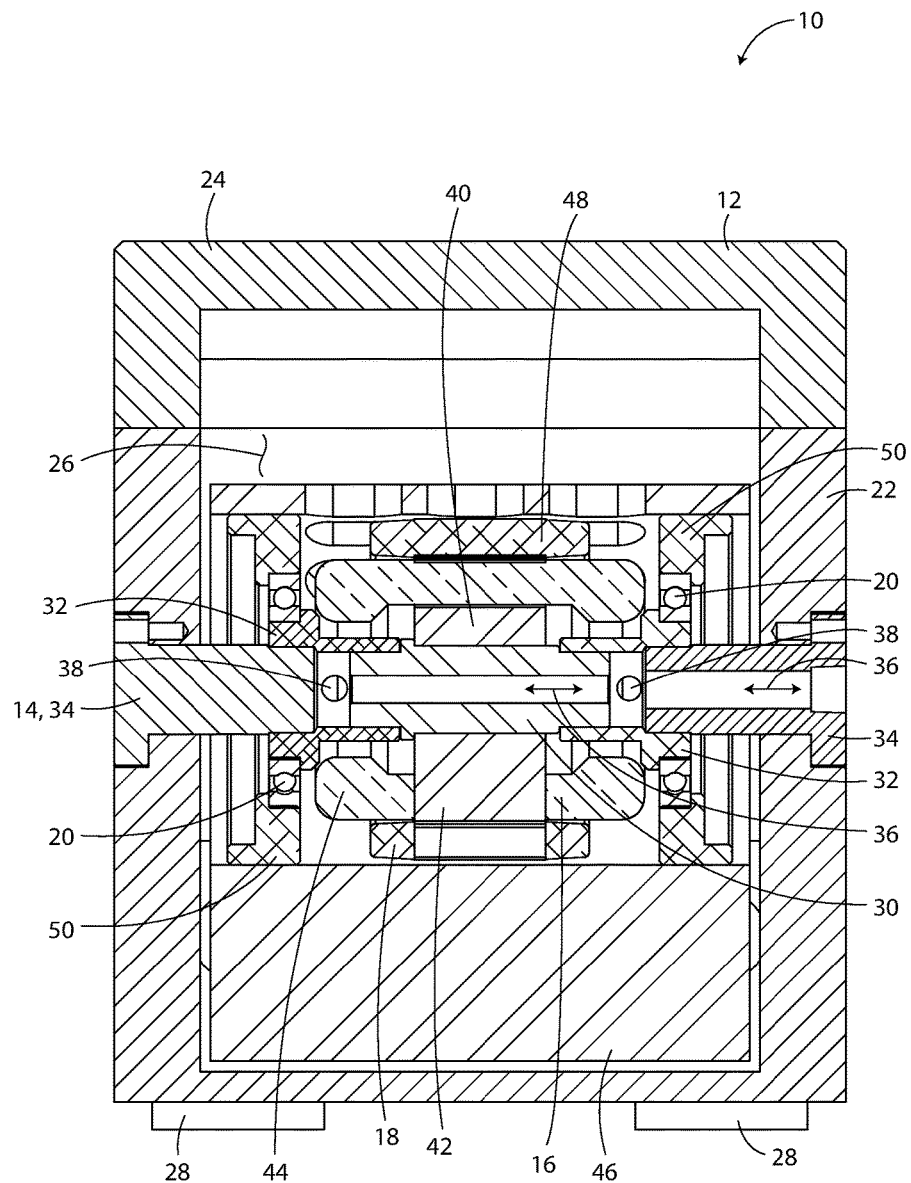
FIG. 3 is a cross-sectional view of the vibrator shown in FIGS. 1 and 2 taken about a plane lying between the front and rear of the vibrator and aligned with the rotational axis of the vibrator.
Figure 4:
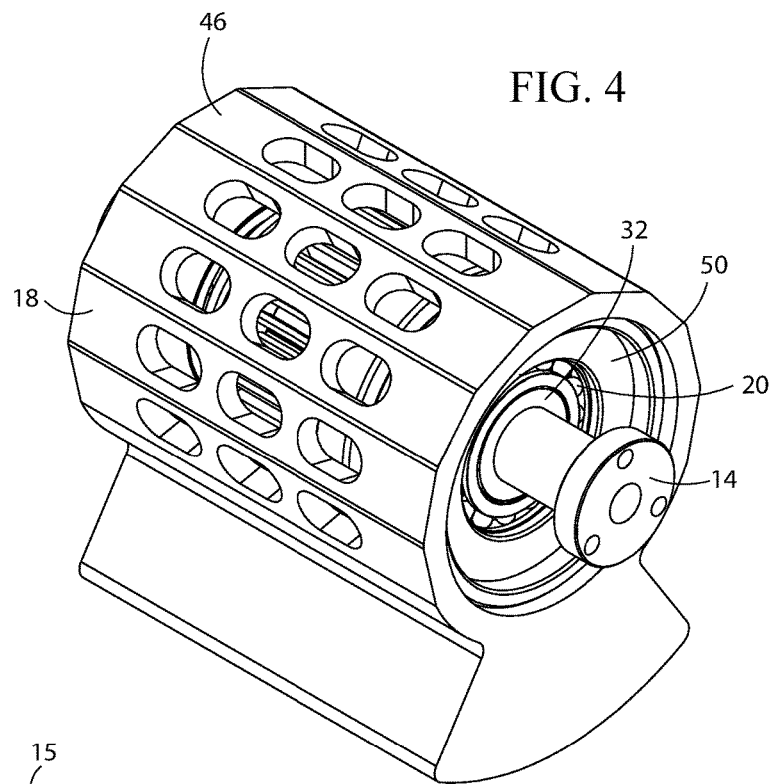
FIG. 4 is a perspective view of the vibrator shown in FIGS. 1-3 with the housing omitted therefrom.
Figure 5:
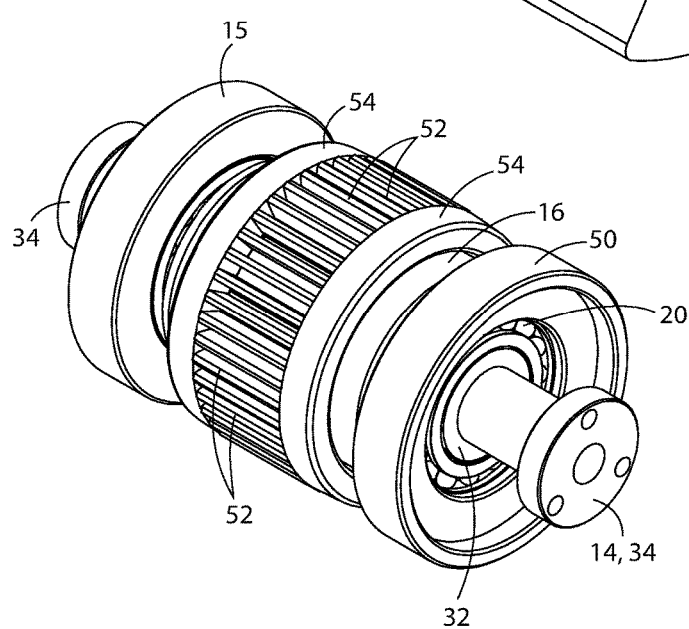
FIG. 5 is a perspective view of the vibrator shown in FIGS. 1-4 with the housing and eccentric weight omitted therefrom.
Figure 6:
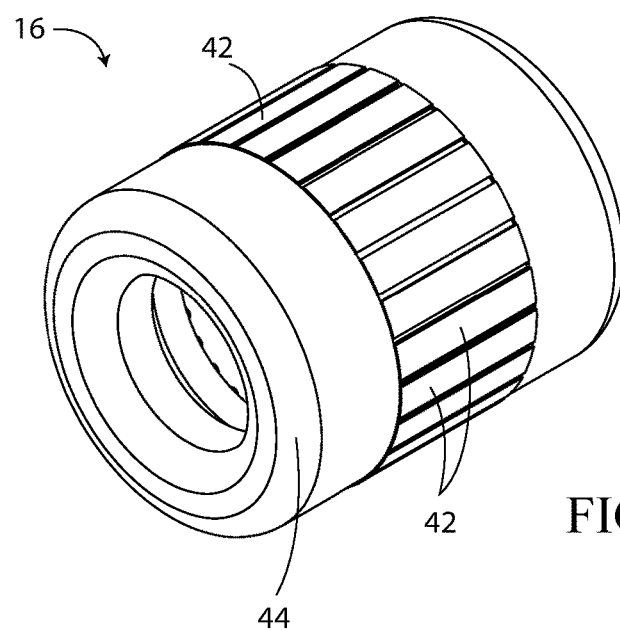
FIG. 6 is a perspective view of the stator of the vibrator shown in FIGS. 1-5.
Figure 7:
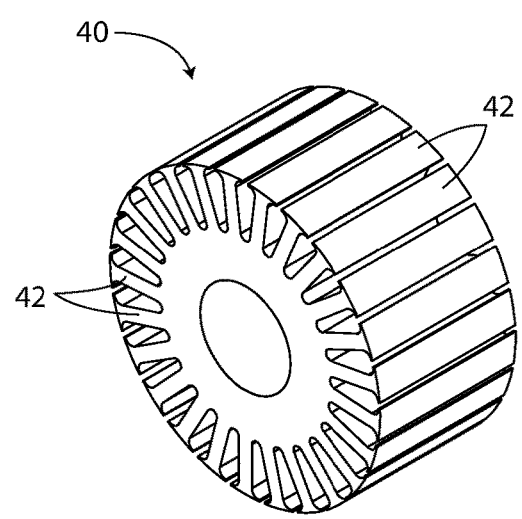
FIG. 7 is a perspective view of the core of the stator of the vibrator shown in FIGS. 1-6.

Each bearing (20) is annular and is mounted on a respective one of the journal members (32) of the shaft (14), with the journal member extending through the center of the bearing. Preferably the bearings (20) are ball bearing rings (as shown) or bushing sleeves. Each bearing (20) is also attached to a respective one of the bearing caps (50) of the rotor (18) in a manner such that the bearing caps and the remainder of the rotors are rotationally connected to the journal members (32) of the shaft (14). As can be appreciated from FIG. 3, the bearing caps (50) and the journal members (32) axially trap the bearings (20) such that the rotor (18) is axially fixed in position relative to the shaft (14).

The industrial vibrator (10) is preferably assembled by forming the stator (16) and thereafter press-fitting it onto the central portion (30) of the shaft (14). An annular ridge on the central portion (30) of the shaft (14) is configured to engage an axial end of the main body (40) of the stator (16) to thereby ensure that the stator and the shaft are axially positioned correctly relative to each other. The journal members (32) of the shaft (14) are then press fit onto the opposite ends of the central portion (30) of the shaft. During these steps, electrical conductors for the windings (44) of the stator (16) are channeled through the axial bores (36) and radial holes (38) provided in the components of the shaft (14). At any time prior to, concurrently with, or following the foregoing, the rotor (18) is partially assembled by forming the squirrel cage assembly (48) and attaching it to the interior of the eccentric weight (46). After press-fitting only one of the bearing caps (50) of the rotor (18) into the eccentric weight (46), the stator (16) and the assembled portion of the shaft (14), along with the bearings (20), are slid into the partially assembled rotor from the non-capped end of the eccentric weight (46). The second bearing cap (50) is thereafter press-fit into the eccentric weight (46) until the bearings (20) are axially fixed between the journal members (32) of the shaft (14) and the bearing caps (50) of the rotor (18). Following all this, the assembly is placed into the internal cavity (26) of the main body (22) of the housing (12) and the mounting portions (34) of the shaft (14) are then inserted in the openings on the main body and partially into the journal members (32) of the shaft, thereby securing the assembly within the main body of the housing. Finally, the cover (24) of the housing (12) is bolted to the main body (22) of the housing to thereby seal the internal cavity (26) of the housing. Thereafter, the vibrator (10) is fully assembled and can be mounted to a bulk material handling device via the mounting portions (28) of the housing (12).

In operation, alternating electric current is supplied to the stator (16) to thereby cause the rotor (18) to rotate about the stator. Since the center of mass of the eccentric weight (46) is radially offset from the axis of rotation, an oscillating radial load is transferred from the rotor (18), to the mounting portions (34) of the shaft (14), then to the housing (12), and then ultimately to the bulk material handling device. It should be appreciated that since the eccentric weight (46) is tubular and has a relatively large inner diameter, the eccentric weight has a high bending stiffness and therefor the loads transferred from the eccentric weight to the bearings (20) are almost purely radial loads. It should also be appreciated that since the housing (12) supports both of the axial ends of the shaft (14) and the bearings (20) are located in close proximity to the walls of the housing, bending forces on the shaft are relatively low. Thus, the load transfer throughout the vibrator (10) minimizes axial loads on the bearings (20) and thereby maximizes the longevity of the bearings. Still further, it should be appreciated that the tubular configuration of the eccentric weight (46) provides the vibrator (10) with a relatively low mass to load ratio.

In view of the foregoing, it should be appreciated that the invention has several advantages over the prior art.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of the preferred embodiment of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed.

What is claimed is:

1. An electrically driven eccentric weight industrial vibrator provided on a bulk material handling device, the industrial vibrator comprising:
    a housing defining an internal chamber, the housing having mounting portions connecting the industrial vibrator to the bulk material handling device;
    a stator, the stator being within the internal chamber of the housing and mounted to the housing via an axial shaft that is fixed to the housing;
    a rotor, the rotor encircling the stator and being rotationally connected relative to the stator, the shaft, and the housing via at least two bearings in a manner such that the rotor is able to revolve around the stator within the internal chamber of the housing and about the shaft, at least one of the two bearings being mounted on and around the shaft, the stator being axially disposed between the two bearings; and
    at least one eccentric weight mounted to the rotor in a manner such that the at least one eccentric weight is able to revolve about the shaft together with the rotor;
    wherein a second of the at least two bearings is mounted on and around the shaft; and
    wherein the shaft comprises an axial bore adapted and configured for routing electrical conductors to the stator.

2. The industrial vibrator and bulk material handling device of claim 1 wherein the bulk material handling device comprises a bulk material transfer chute.

3. The industrial vibrator and bulk material handling device of claim 1 wherein the bulk material handling device comprises a sifting screen.

4. The industrial vibrator and bulk material handling device of claim 1 wherein the bulk material handling device comprises a sorting screen.

5. The industrial vibrator and bulk material handling device of claim 1 wherein the bulk material handling device comprises a bulk material storage hopper.

6. An industrial vibrator provided on a bulk material handling device, the industrial vibrator comprising:
    a housing with axially opposite spaced apart side walls at least in part defining a hollow interior of the housing, the housing having mounting portions connecting the industrial vibrator to the bulk material handling device;
    a shaft fixed to and extending between the spaced apart side walls in the interior of the housing and defining a center axis;
    a stator mounted on and rotationally fixed to the shaft;
    a rotor assembly disposed about the stator and configured to rotate about the shaft within the hollow interior of the housing, the rotor assembly including a weight having a center of gravity offset from the center axis; and
    at least two bearing assemblies mounted to the shaft and to the rotor, the bearing assemblies being adapted and configured to enable the rotor to rotate about the shaft, one of the at least two bearing assemblies being mounted to the shaft on one axial side of the stator and the other of the at least two bearing assemblies being mounted to the shaft on an opposite axial side of the stator;
    wherein the shaft comprises an axial bore adapted and configured for routing electrical conductors to the stator.

7. The industrial vibrator and bulk material handling device of claim 6 wherein the bulk material handling device comprises a bulk material transfer chute.

8. The industrial vibrator and bulk material handling device of claim 6 wherein the bulk material handling device comprises a sifting screen.

9. The industrial vibrator and bulk material handling device of claim 6 wherein the bulk material handling device comprises a sorting screen.

10. The industrial vibrator and bulk material handling device of claim 6 wherein the bulk material handling device comprises a bulk material storage hopper.

* * * * *